United States Patent Office 3,271,482
Patented Sept. 6, 1966

3,271,482
PROCESS OF RECOVERING WASTE SYNTHETIC
RESIN MATERIAL
Kazuya Harada, Mishima-shi, Shizuoka-ken, and Tsutomu
Aoyagi, Shizuoka-ken, Japan, assignors to Toyo Rayon
Kabushiki Kaisha, Tokyo, Japan, a corporation of Japan
Filed Nov. 21, 1963, Ser. No. 325,355
Claims priority, application Japan, Dec. 7, 1962,
37/53,948
7 Claims. (Cl. 264—15)

This invention relates to a process of recovering waste synthetic resin material, more specifically to a process for treating waste synthetic resin material to make it reusable. The process is for treatment of waste synthetic resin material which has, when it is crushed to such a size it passes a 6-mesh wire gauze but not a 10-mesh wire gauze, an angle of rest of over 70°. The process comprises heating and deforming the waste synthetic resin material under agitation, if necessary and heating the same from around, by means of a heating jacket, until said waste material reaches a temperature above the deformation temperature but below the melting point thereof, and thereafter cooling and taking the same out for recovery.

The object of the present invention is to improve the characteristics of waste material, especially uniaxially and biaxially orientated thin films, sheets and tapes, so that the waste material to be reused does not need to be pulverized to extra-fine powder which is disadvantageous industrially, but may be crushed by an ordinary crusher, and yet when the waste so crushed is processed singly or in admixture with other additives or with another material of different form, it can be extruded in a steady and stabilized manner.

Molding or secondary processing of thermo-plastic resins is always accompanied by production of waste thereof.

For example, in the manufacture of thermoplastic biaxially orientated thin films, it sometimes happens that portions of the film have an uneven thickness, and hence, the film becomes waste.

Again, in injection molding, defective products and pouring openings formed integrally with the moldings become waste.

In molding or secondary processing of thermoplastic resin, therefore, the way of recovering the waste which is inevitably produced as above has a considerable bearing upon the cost of the completed product.

Usually the waste is crushed by a crusher, and the crushed waste is reused alone or in admixture with other powdery material or with other material of different form.

While the finer the crushed waste, the easier the use of the material will be in many cases, it is not always advantageous to pulverize the waste to extremely fine powder, and this is frequently rather impractical industrially for economic reasons. Hence the waste should be crushed only to such an extent that the crushed size does not obstruct reuse thereof.

The size of the crushed waste is decided upon not only by economic considerations as mentioned above, but by the ease of treatments such as drying, and the smoothness of feeding to an extruder.

Heretofore the waste material has been formed initially into gut-like shapes and cut to suitable lengths, or formed into flat sheets and then cut to polygonal shapes.

The pieces of material of such shapes have in many cases an angle of rest of less than 70°, and have presented practically no difficulty as regards feeding to extruders or the like as long as they are used as such.

However, crushed waste material sometimes causes so-called "clogging" or "rack-forming" of extruders or the like when it is used singly or in mixture with other powdery or flaky material.

Said phenomenon takes place when the material supplied through the hopper of an extruder or the like is not fed to the screw portion but clogs the passage to form a space ahead of said portion, or clogs the portion connecting the hopper and the screw to form a similar space. This results in inadequate feeding of the material to the screw of the extruder or the like, and hence failure to attain a desired amount of discharge.

In the case of mixed material, such troubles as separation of the powder, small pieces, and crushed waste (here the expression "small pieces" means what have been called either chips or flakes, and the expression "crushed waste" means waste produced during the process of manufacture or molding of films and which has been crushed for reuse) and subsequent changes in the mixing ratio have occurred so frequently that use of mixed material has been considerably restricted.

We studied these problems carefully and extensively, and found that:

(A) Waste finely crushed to such an extent that it passes 15–20 mesh gauzes will not cause the troubles as above described; and (B) of the crushed waste pieces, those relatively close to globules and cubes in shape seldom cause the foregoing troubles, while flaky pieces (e.g. films and sheets crushed to pieces) tend to produce said troubles.

In the case of (A) above, a special extra-fine pulverizer is required for crushing the waste to such a fine grain size. Such a pulverizer, however, has too poor productivity to justify its use on an industrial basis. But if the waste is to be crushed to a size coarser than 7–10 mesh an ordinary crusher will serve the purpose efficiently with facility.

We further studied (B), and found that whether the troubles tend to be produced or not depends upon the shape of material before crushing, and if when the waste is crushed to a size which passes a 6-mesh wire gauze but not a 10 mesh gauze, it has an angle of rest of over 70° it is very likely to cause the aforesaid troubles in use, and therefore we may conclude that 70° is a critical point. By employing an ordinary crusher, the crushing of the material to the size to pass a 10 mesh wire gauze can be carried out very efficiently, but the ability to crush to a finer size than that becomes inefficient suddenly, particularly in the case of a thermoplastic resin.

According to our experience using crushers of the same capacity, when comparing the ability to crush to the size to pass a 10 mesh wire gauze with the ability to crush to the size to pass a 20 mesh or finer wire gauze, the ability of the latter is less than $\frac{1}{100}$ of the former, so that the latter is of small practical value.

For the material of the size to pass said 6–10 mesh wire gauzes, an angle of rest of 70° is considered to be the limit defining the material which is suitable for extrusion and other operation.

As is clear from the following Table 1 and Table 2, this range of the angle of rest is the limit. The present invention is applied only to the material that exceeds said limit. The troubles arise in most cases with sheet-like material with a thickness of less than 1 mm. especially 0.1 mm. and with flaky and similarly shaped pieces, to a less extent.

The present invention provides a process whereby waste crushed not by an apparatus of low productivity such as an extra-fine pulverizer as above described, but by an ordinary crusher to a size not finer than 10 mesh is used as the raw material and is conditioned so that it can be extruded and otherwise treated with ease.

FIG. 1 is a top view of an instrument for measuring the angle of rest of waste material, and FIG. 2 is a cross sectional view thereof.

After determination of the angle of rest, a cylindrical container 1, 150 mm. in inside diameter and 200 mm. in height, which is provided with a hole 2, 30 mm. in diameter, on the bottom thereof, is used. After said hole 2 has been closed with a plate 3, the container is filled with the material whose angle of rest is to be determined. The plate 3 is withdrawn and the central portion of the material is discharged through said hole 2 which leaves a truncated conical space.

Here the angle which the surface of the material remaining in the cylindrical container 1 forms with respect to the horizontal plane is regarded as the angle of rest of the material. The angle of rest $\theta$ can be readily found, on the basis of the length $h$ from the peak of the remaining material to the top end of the cylindrical container at several points on the circumference, from the following formula:

$$\theta = \tan^{-1}\{(200-h)/60\}$$

The present invention characteristically comprises heating waste material which meets the above-requirements, with or without addition of additives, and/or other materials of substantially the same composition but of different shape and the like, under agitation, and, if, necessary, with application of heat from around by means of a heating jacket, up to a temperature above the deformation temperature but below the melting point of said waste material, and thereafter cooling same.

This invention is effectively applicable to waste materials which are mixtures of PVC containing not more than 15% of plasticizer and copolymers primarily of vinyl chloride, mixtures composed mainly of PVC or vinyl copolymers and partly of other polymers, and more effectively to waste which is PVC containing not more than 5% of plasticizer.

The invention is also effective, in some cases, for waste materials which are polyethylene, polypropylene or other polyhydrocarbons or mixtures of polyhydrocarbons with small percentages of other polymers. The invention is most effective for waste material of orientated film of PVC, polypropylene or the like. In our opinion, the reason for this phenomenon is that thermal shrinkage of oriented film above the deforming temperature is larger than that of non-oriented films. Although the resins to which this invention is applicable are not confined to those mentioned above, the temperature requirements for heating vary with individual resins, and are decided upon, in most cases, experimentally. For example, when the waste material is composed chiefly of straight PVC which contains not more than 5% of a plasticizer, the material is heated under violent agitation to a temperature higher than 150° C. but lower than 180° C., and cooled, while being still agitated, to a temperature between 140° C. and 80° C., and then is taken out.

If the waste material is mostly polypropylene, it is advisable to heat the material under violent agitation to a temperature between 135° C. and 155° C., and thereafter cool it rapidly to less than 100° C.

As the mixing and agitating equipment to be used for the invention, Henschel's mixer is most suitable.

By adopting the process of the invention it is possible to improve remarkably the apparent specific gravity and the angle of rest of crushed waste or a given mixture of crushed waste and chips or powdery material, and also to prevent any separation of crushed waste and chips or powdery material in said mixture.

The effects attainable by the present invention will be described hereunder in further detail with reference to the following comparative experiments.

COMPARATIVE EXPERIMENT 1

Various forms of rigid polyvinyl chloride, i.e. 100μ-thick film, 2 mm.-thick pipe, moldings and blocks, were crushed by an ordinary commercially-available crusher, to crushed waste ranging in size from 6 mesh to 10 mesh. For comparison, a thin film, 100μ in thickness, was crushed by an extra-fine pulverizer of almost the same size as the crusher above referred to, to such an extent that the pulverized material passed through a 20 mesh wire gauze.

20 parts of each crushed waste was mixed with 80 parts of a dry blend of the same composition, and each mixture was extruded by a 65 mm. extruder.

The properties of the crushed waste materials were as shown in Table 1.

*Table 1*

| Form of material | Crusher | Crushing capacity | Angle of rest of crushed waste, deg. | Angle of rest of mixture, deg. | Extrudability |
| --- | --- | --- | --- | --- | --- |
| Thin film | Ordinary crusher. | 30 kg./hr | >90 | >90 | Not extrudable. |
| Pipe | do | 35 kg./hr | 75 | >90 | Do. |
| Molding | do | 40 kg./hr | 53 | 50 | Good. |
| Block | do | 40 kg./hr | 45 | 44 | Do. |
| Thin film | Extra-fine pulverizer. | 100 g./hr | 51 | 52 | Do. |

The results of this experiment indicate that, when waste material in the form of a thin film or a pipe of thin wall thickness is crushed by an ordinary crusher, the crushed waste cannot be extruded as it is.

On the other hand, an extra-fine pulverizer produces good pulverized waste, but the productivity of the machine is too low to justify its industrial application.

COMPARATIVE EXPERIMENT 2

100μ-thick film of rigid polyvinyl chloride was crushed by an ordinary crusher into a crushed waste passable through a 4 mesh wire gauze. The thermally deformable temperature of this waste was 78° C., and the angle of rest thereof was 90°. Test specimens each consisting of 20 parts of this waste and 80 parts of a dry blend of the same composition were charged into a Henschel mixer, heated to maximum temperatures of 70° C., 100° C., 140° C. and 170° C., under agitation at 1,500 r.p.m., cooled with cold water circulated through a jacket, while being agitated at 750 r.p.m., and taken out when the internal temperature dropped to 170° C., 140° C., 100° C., 70° C. and 40° C. For comparison, 20 parts of crushed waste and 80 parts of a dry blend were mixed by an ordinary ribbon blender at a temperature of 100° C. with heat being applied from outside.

Further, the crushed waste alone was agitated in a Henschel mixer at 1500 r.p.m. until the temperature reached 160° C., then cooled with cold water at 15° C. supplied to the jacket, with further agitation at 750 r.p.m., until the internal temperature dropped to 100° C., and taken out.

The results obtained by extruding the mixtures from a 65 mm. extruder are shown in Table 2.

Table 2

| Materials | Max. temp., °C. | Discharge temp., °C. | Behavior of mixture | Angle of rest, deg. | Extrudability |
|---|---|---|---|---|---|
| Mixture | 70 | 70 | Chips remain unchanged. Chips are readily separable from powder. | 90 | Does not drop from the hopper. Not extrudable. |
|  | 70 | 40 | ......do...... | 90 | Do. |
|  | 100 | 100 | Chips are slightly deformed. Chips and powder retain a slight tendency for separation. | 68 | Drops from the hopper, but not satisfactorily. Extrudable somehow or other. |
|  | 100 | 70 | ......do...... | 65 | Do. |
|  | 100 | 40 | ......do...... | 65 | Do. |
|  | 140 | 140 | Chips are markedly deformed. No noticeable separation between chips and powder. | 58 | Drops from the hopper almost satisfactorily. Extrudable. |
|  | 140 | 100 | ......do...... | 52 | Do. |
|  | 140 | 70 | ......do...... | 55 | Do. |
|  | 140 | 40 | ......do...... | 57 | Do. |
|  | 170 | 170 | Chips are deformed and rounded. Solidified as a whole, and not readily cracked. |  |  |
|  | 170 | 140 | Contains a considerably large percentage of small lumps which are readily cracked. Chips and powder are not separable at all. | 46 | Extrudable with least difficulty. |
|  | 170 | 100 | No lumps and no separation of chips and powder. | 48 | Do. |
|  | 170 | 70 | ......do...... | 50 | Do. |
|  | 170 | 40 | ......do...... | 56 | Do. |
| Blended by a ribbon blender. |  |  | Practically all chips are not deformed. Chips and powder are separated readily. | 90 | Not extrudable. |
| Crushed waste | 160 | 100 | Chips are completely deformed. | 53 | Extrudable with little difficulty. |

Thus the Comparative Experiment 2 demonstrates the following:

(A) The best result is obtained when a high-speed agitation mixer such as Henschel type mixer is used for the waste material at a temperature higher than the thermally deformable temperature therefor.

(B) A ribbon blender fails to provide any satisfactory effect.

(C) Whether the crushed waste is used singly or in mixture with a dry blend, the effect is attained in like manner.

(D) A better result is obtained when the treated material is taken out after having been cooled than when it is discharged hot.

The present invention is applicable to waste material which, when crushed to a size passable through a 6 mesh wire gauze but not through a 10 mesh gauze, has an angle of rest of over 70°.

*Example 1.*—A mixture of 100 parts of straight PVC with a degree of polymerization of 1100, 30 parts of PVC scrap which has passed a 2 mesh wire screen (consisting of 100 parts of straight PVC, 2 parts of organo-tin stabilizer, and one part of lubricant) (the angle of rest of the crushed waste which has passed a 6 mesh screen being 90°), 2.2 parts of organo-tin stabilizer, and 1.1 parts of lubricant, was charged into a Henschel type mixer. The agitation impeller was revolved at 1,500 r.p.m., and the temperature inside the mixer was elevated to 160° C., and then cold water at 15° C. was supplied to the jacket and circulated therethrough until the internal temperature dropped to 120° C., before the charge was taken out. The angle of rest of the dry blend was 45°, and the waste was completely deformed, and no separation of waste and powder was observed. Also there were no lumps formed. The material was then extruded by means of a 90 mm. extruder, successfully without any troubles.

*Example 2.*—A mixture of 100 parts of bulk-polymerized straight PVC with a degree of polymerization of 850, 20 parts of PVC scrap which had passed a 2-mesh wire screen (consisting of 100 parts of bulk-polymerized straight PVC with a degree of polymerization of 850, 2 parts of organo-tin stabilizer, one part of lubricant, and 5 parts of plasticizer (DOP)) (the angle of rest of the crushed waste which had passed a 6-mesh screen being 90°), 2.2 parts of organo-tin stabilizer, 1.1 parts of lubricant, and 5 parts of plasticizer, was charged into a Henschel type mixer. Then the agitation impeller was revolved at 1,500 r.p.m., and the temperature inside the mixer was elevated to 150° C., and then cold water at 15° C. was supplied to the jacket and circulated therethrough, until the internal temperature dropped to 110° C., when the charge was taken out. The angle of rest of the dry blend was 53°, and the waste was completely deformed, and no separation of waste and powder was observed. Although there were some lumps, they could be crushed simply by hand. The material was extruded by a 90 mm. extruder in a satisfactory manner.

*Example 3.*—A filmy waste of biaxially orientated film consisting of 100 parts of straight PVC with a degree of polymerization of 1,000, 2 parts of tin stabilizer, and one part of lubricant was crushed by an ordinary crusher to such a size that it passed a 4-mesh wire gauze but not a 10-mesh gauze and had an angle of rest of 90°. The thermally deformable temperature of the material was 72° C. The crushed waste alone was charged into a Henschel type mixer, agitated at 1,500 r.p.m., heated to internal temperatures of 70° C., 100° C., and 160° C., and the jacket was supplied with cold water. Then the material was transferred to a ribbon blender, cooled to 40° C. under agitation, and was taken out. The conditions of the waste were as shown in Table 3.

Table 3

| Maximum temperature | Condition of waste material | Angle of rest, ° |
|---|---|---|
| 70° C. | Remains substantially unchanged. | 90 |
| 100° C. | Considerably reduced in size and generally rounded in shape. | 64 |
| 160° C. | Markedly reduced in size, and rounded. | 52 |

Of the test specimens, those subjected to maximum temperatures of 100° C. and 160° C. were extruded singly and in mixture with dry blends of the same compositions, at mixing ratios of waste: dry blend=20:80, and 40:60, by means of a 90 mm. extruder. They were invariably capable of extrusion with no difficulty.

*Example 4.*—Waste comprising 0.1 mm. thick biaxially orientated film of polypropylene whose limiting viscosity number as determined with tetralin at 135° C. was 2.8 was crushed by an ordinary crusher. The chips obtained ranging in size from 6-mesh to 10-mesh (angle of rest: 90°; and thermally deformable temperature: 118° C.) were charged in a V-type blender and a Henschel type mixer, either singly or in mixture with polypropylene powder with the same instrinsic viscosity at waste-to-powder ratios of 10:90, 20:80, and 50:50, and were mixed at maximum temperatures of 100° C., 130° C. and 150° C., and discharge temperature of 40° C. (with other conditions the same as in Examples 1–3).

The mixtures were extruded by a 65 mm. extruder for testing.

The results are given in Table 4.

*Table 4*

| Mixtures | Mixing method | Condition of mixture | Angle of rest of mixture, deg. | Extrudability |
|---|---|---|---|---|
| Waste alone | | | 90 | Not extrudable. |
| Do | By a V-type blender | Remains unchanged | 90 | Do. |
| Do | Mixed at 100° C. by a Henschel type mixer. | Remains substantially unchanged | 90 | Do. |
| Do | Mixed at 130° C. by a Henschel type mixer. | Waste is reduced in size and slightly rounded. Partially conglomerated. | 51 | Extrudable. |
| Waste: powder: | | | | |
| 10:90 | Mixed at 150° C. by a Henschel type mixer. | Waste is reduced in size and rounded | 42 | Extrudable very Satisfactorily. |
| 20:80 | do | do | 45 | Do. |
| 50:50 | do | Waste becomes smaller and rather adhesive to form a large lump. | 49 | Do. |

*Example 5.*—Following the same procedures as in Example 1 but using instead of the Henschel type mixer a commercially-available mixer characterized by instantaneous mixing of the charge with a similarly high shearing force, a substantially same effect as in Example 1 was accomplished.

The angle of rest was determined in the following way:

An instrument as shown in FIG. 1 was used. It was filled up to the upper rim with a test specimen which was poured in without pressure through a funnel. The specimen above the upper rim was raked off with a glass rod, and the plate across the hole in the bottom was removed, thereby to allow the part of the specimen inside to drop through the hole, and then the angle of the surface of the remaining specimen in the container with respect to a horizontal plane was measured as the angle of rest of the specimen.

The thermally deformable temperature of waste material was determined as follows:

Waste material approximately 3 mm. square, was placed on a heater device under a microscope of 20 magnifications, and was heated by a temperature increase at the rate of 2° C./min. until the chip began deforming, when the temperature was regarded as the thermally deformable temperature of said waste chip.

What we claim is:

1. A process of recovering waste synthetic resin material which when it has such a size that it passes a 6 mesh wire gauze but not a 10 mesh gauze has an angle of rest of over 70°, the treatment comprising heating and deforming the waste material under agitation, until said waste material reaches a temperature above the deformation temperature but below the melting point thereof, and thereafter cooling and collecting the treated waste material.

2. Process of rendering suitable for extrusion a waste synthetic resin material which passes through a 6 mesh wire gauze but is held by a 10 mesh wire gauze and which has an angle of rest of greater than 70° by heating the waste material under agitation until the material reaches a temperature above its deformation temperature but below its melting point, thus causing deforming thereof, and thereafter cooling and collecting the deformed material.

3. Process of rendering suitable for extrusion a waste synthetic resin material selected from the group consisting of films, sheets, and tapes which comprises crushing the material to a size such that it passes through a 6 mesh wire gauze but is held by a 10 mesh wire gauze, the material in the crushed state having an angle of rest greater than 70°, and heating the crushed material under agitation until the material reaches a temperature above its deformation temperature but below its melting point, thus causing deforming thereof, and thereafter cooling and collecting the deformed material.

4. Process according to claim 1, wherein the waste synthetic resin material is made from orientated film.

5. Process according to claim 1, wherein the waste synthetic resin material is made from film, whose thickness is not more than 0.1 mm.

6. Process according to claim 1, wherein the synthetic resin is selected from the group consisting of rigid polyvinyl chloride and copolymers primarily of vinyl chloride.

7. Process according to claim 1, wherein the synthetic resin is polypropylene.

References Cited by the Examiner

UNITED STATES PATENTS

| 2,936,301 | 5/1960 | Thomas et al. | 264—127 |
| 2,998,397 | 8/1961 | Riesing | 264—127 |
| 3,229,022 | 1/1966 | Feder | 264—15 |

ALEXANDER H. BRODMERKEL, *Primary Examiner.*

F. S. WHISENHUNT, *Assistant Examiner.*